Aug. 5, 1958     J. J. MANCUSI, JR     2,845,945
SEALING ELEMENTS
Filed Dec. 6, 1956
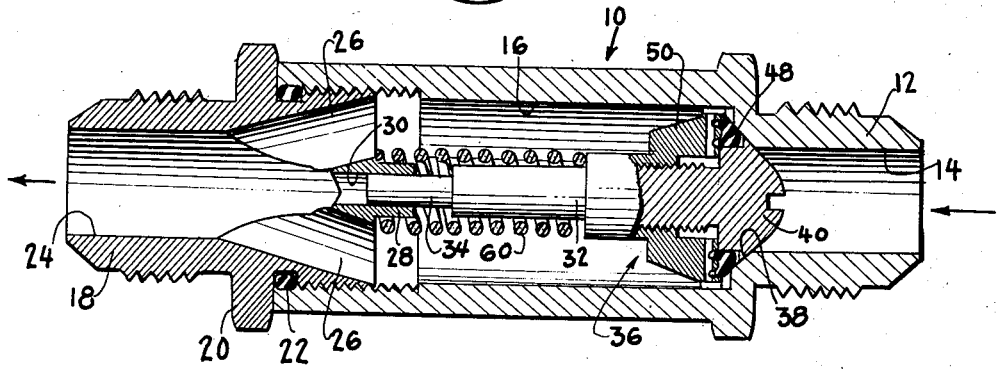
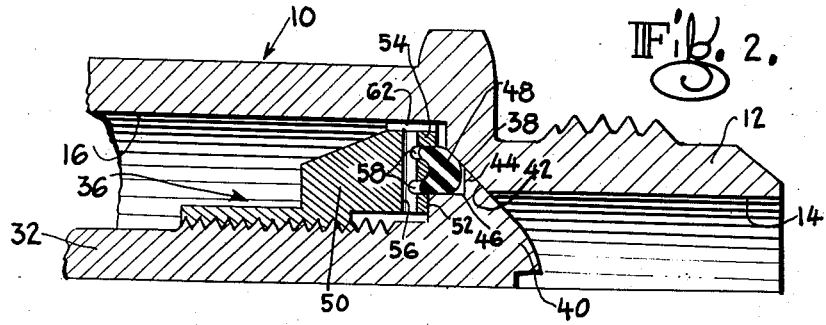
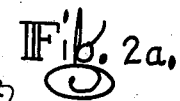
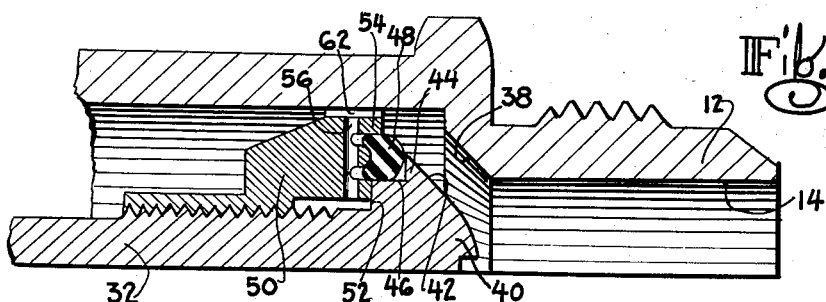
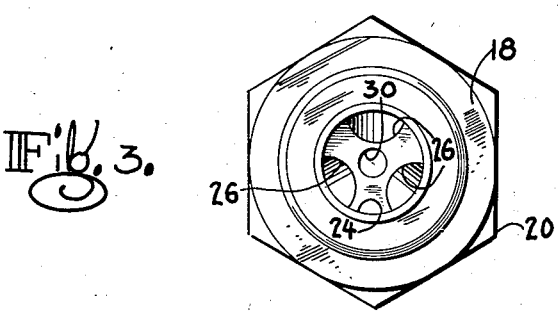
INVENTOR
Joseph J. Mancusi, Jr
BY
Joseph B. Taphorn
ATTORNEY

2,845,945

SEALING ELEMENTS

Joseph J. Mancusi, Jr., Tuckahoe, N. Y., assignor to Altair Inc., Mount Vernon, N. Y., a corporation of New York Application December 6, 1956, Serial No. 626,660

2 Claims. (Cl. 137—469)

This invention relates to valves and more particularly to valves capable of handling large volumes under high pressures.

Valve seals utilized today embody, whenever possible, the flexible O-ring formed of a resilient material such as rubber. It has been impossible, however, to employ such O-rings satisfactorily in valves controlling the flow of large volumes at high pressures for the reason that such flows tended to destroy the seals by ripping the O-rings from their seats and carrying them downstream.

Hence, a prime object of this invention is to provide a durable valve utilizing an O-ring sealing element to handle large volumes under high pressures.

According to the invention, an advantageous application of the law expressed in Bernoulli's theorem is utilized to retain an O-ring in its seat and thus prevent its destruction. The theorem may be formally expressed as follows: "When an incompressible liquid speeds up in going from one position to a second position, then its head due to elevation or pressure decreases." In other words, the faster a liquid such as oil travels, the lower its lateral pressure becomes. Applicant effectively employs this principle by so designing the valve that the cross-sectional area of the passageway at the valve seat when the valve is open is greater than that at another point. Since, according to Bernoulli's theorem, a lower pressure will obtain at the narrower point in the passageway because of the necessary speed up of fluid passing therethrough than will obtain in front of the O-ring at the valve seat, it will be evident that by applying this lower pressure to the rear of the O-ring, there will arise forces acting to hold the O-ring in its seat. Applicant has found these forces to be of such magnitude as to render feasible the employment of O-rings in valves handling large volumes under high pressures, such as three to five thousand pounds per square inch (3000 to 5000 p. s. i.).

A feature of the invention resides in the fact that a complete seal can be obtained through a complete range of pressures. Because of the retention of the flexible O-ring, a full seal from zero (0) through three thousand (3000) pounds per square inch and beyond pressure may be had.

These and other objects, features, and advantages of the invention will become apparent from a reading of the following detailed description when considered with the accompanying drawing which discloses by way of example a preferred embodiment of the invention.

In the drawing:

Fig. 1 is a longitudinal sectional view through a check valve embodying the invention.

Fig. 2 is an enlarged view of a portion of the valve disclosed in Fig. 1 and showing in particular the details of the valve seat.

Fig. 2a shows the valve portion of Fig. 2 in the open condition of the check valve.

Fig. 3 is a left hand end view of the valve disclosed in Fig. 1.

The invention is shown as embodied in a check valve.

As seen in Fig. 1, the valve may be a main cylindrical body 10 formed at one end with a threaded reduced end portion 12 having an axial bore 14 communicating with the interior 16 of the main body 10 and forming the inlet orifice. The other end of the body 10 is interiorly threaded to mount an exteriorly threaded end plug 18 formed integral with a flange 20 normally disposed in abutting relationship to the body 10. An O-ring 22 serves to complete the seal between the body 10 and the end plug 18.

The end plug 18 provides the outlet orifice in the form of a bore 24 which communicates with the interior 16 of the body 10 through diagonally extending borings 26 (Figs. 1 and 3) located in the inner end of the plug. The inner end of the plug is formed with an extension 28 having a central opening 30 which slidably supports a valve stem 32 by receiving its reduced end 34.

The other end of the stem mounts the valve head, generally indicated by the numeral 36, which cooperates with a tapered valve seat 38 formed about the inner end of the bore 14. As may be particularly seen in Fig. 2, the other end of the stem 32 is enlarged at 40 and formed on its outer surface with a slope 42 which parallels the taper on the seat 38. In the closed condition of the valve, the surfaces 38 and 42 abut each other and serve to define the terminal position of the valve head. Slope 42, however, terminates intermediately of the tapered seat 38 and is sharply cut away therebehind to define a nose 44 and form a relief 46 on which is seated an O-ring 48. An element 50 is threaded on the stem 32 until it abuts the shoulder 52 of the relief 46 to hold the O-ring on the relief and, in the open condition of the valve, in engagement with the nose 44. As seen in Fig. 2a, the O-ring normally projects beyond the contour of the surface 42 so that when the surface 42 approaches the valve seat 38 to close the valve, the O-ring 48 engages the seat to seal off fluid flow. Maximum compression of the O-ring is determined by the engagement of surface 42 with seat 38 as shown in Fig. 2.

As observed earlier, in valves handling large volumes of fluid under high pressures, there are destructive forces which tend to pull the O-rings out of their locations and carry them downstream. Efforts to overcome this trouble include the provision of an overhang 54 on the element 50 which acts to complete the enclosure of the O-ring in its location save where it faces the valve seat 38. The O-ring is thus trapped, but even these measures by themselves have failed to retain the O-ring under the operating conditions mentioned.

To overcome this difficulty, applicant has so constructed the element 50 as to introduce forces which will counteract those tending to pull the O-ring out of its location during fluid flow. Thus, the element 50 is made of such size that in the open condition of the valve (Fig. 2a) wherein the reduced stem end 34 is fully received in the extension 28, the area of the passageway between the outer surfaces of the element 50 and the inner surfaces of the body 10 will be less than that between the O-ring 48 and the valve seat 38 and hence will have faster fluid flow having lower lateral pressure according to Bernoulli's theorem. This lower lateral pressure is applied to the back of the O-ring so that the difference in the pressures acting behind it and on its exposed surface will operate to create forces effective to retain the ring in its location in spite of the most adverse fluid flow condition. The application of the lower pressure to the back of the O-ring is effected by providing radial borings 56 in the element 50 which extend from the periphery and intersect circumferential grooves 58 cut in the front face of the element.

As is well known, a check valve limits fluid flow to one direction. Thus, whenever the downstream pressure, say in the outlet 24 equals or exceeds that in the inlet 14, the stem 32, under the action of a compression spring 60 reacting between the retaining element 50 and the end plug 18, will move to the right to move the head 36 into sealing engagement with the seat 38. As particularly shown in Fig. 2, the O-ring 48 will engage the seat to prevent back flow, maximum compressive loading of the O-ring under the influence of back pressures being limited by engagement of the valve head surface 42 with the valve seat 38.

Now, when the pressure condition reverses itself, that is when a higher pressure obtains in the inlet orifice than in the outlet one 24, as when a control valve is opened, the valve head 36 will be forced to the left and a rush of fluid will take place between the valve seat 38 and the O-ring 48 and between the interior surface of the body 10 and the periphery of the retainer element 50 held uniformly spaced from the body 10 by radially spaced longitudinally extending guide vanes 62. If the change in pressure condition is great enough, the friction between the resulting very-rapidly-moving fluid and the O-ring will tend to pull deformable rubber O-ring out of its location between the nose 44, the element 50, the relief 46, and the overhang 54. This destructive tendency will be overcome, however, by the introduction of lower pressures in the grooves 58 behind the O-ring. These lower pressures are obtained from the side pressures resulting from the increased velocity of the fluid rushing through the narrower passageway along the retainer element 50. Borings 56 apply these lower pressures to the intersecting grooves 58. The friction forces tending to pull the O-ring out of its location are, therefore, offset by the forces resulting from the higher pressures in front of the O-ring and the lower pressures in the grooves 58 behind it.

A particularly significant feature of the invention is the fact that the greater the friction forces become because of increased fluid flow, the greater will be the forces tending to hold the O-ring in place with the result that the seal remains indestructible even with very high fluid velocities and yet is an effective seal throughout the complete range of pressures.

It is evident, therefore, that applicant has provided a seal capable of handling large volumes of fluids at high pressures. Ingenious application of Bernoulli's theorem has made this possible and with the utmost simplicity of construction thereby facilitating ease of manufacture.

Applicant has shown a preferred embodiment of the invention. Other embodiments will be readily apparent to a person skilled in the art and it will be understood that various omissions and substitutions and changes in the form and details of the valve disclosed and in its operation may be made without departing from the spirit of the invention. It is intended, therefore, to be limited only by the scope of the following claims.

What is claimed is:

1. In a valve, a body having a passageway, a valve seat about said passageway, a valve head in said passageway and movable between an open position and a closed position adjacent said seat, a sealing element carried by one of said head and seat and engaging the other when the head is in the position adjacent said seat, the cross-sectional area of the space in said passageway about said head being less than that between the sealing element and the other of said head and seat in the open position of the head, and means for applying the lower pressure obtaining in the passageway about said head during fluid flow to the unexposed side of the sealing element to prevent its being carried downstream.

2. In a valve, a body having a passageway, a valve seat about said passageway, a valve head in said passageway and movable between a closed position adjacent said seat and an open position, an O-ring carried by said head so as to engage said seat in the closed position of the valve head, the cross-sectional area of the space in said passageway about said head being less than that between the O-ring and the seat in the open position of the head, and openings extending inwardly of the periphery of the head to the unexposed side of the O-ring to apply the lower pressures obtaining about said head during fluid flow to the unexposed side of the O-ring to prevent its being carried downstream.

References Cited in the file of this patent

UNITED STATES PATENTS

| | | |
|---|---|---|
| 2,431,437 | Van Der Werff | Nov. 25, 1947 |
| 2,542,390 | Brown | Feb. 20, 1951 |
| 2,676,782 | Bostock et al. | Apr. 27, 1954 |